United States Patent
Nakagawa

(10) Patent No.: US 6,907,344 B2
(45) Date of Patent: Jun. 14, 2005

(54) NAVIGATION SYSTEM

(75) Inventor: Takahiro Nakagawa, Kobe (JP)

(73) Assignee: Fujitsu Ten Limited, Hyogo (JP)

( * ) Notice: Subject to any disclaimer, the term of this patent is extended or adjusted under 35 U.S.C. 154(b) by 0 days.

(21) Appl. No.: 10/373,702

(22) Filed: Feb. 27, 2003

(65) Prior Publication Data

US 2003/0163250 A1 Aug. 28, 2003

(30) Foreign Application Priority Data

Feb. 28, 2002 (JP) ........................................ 2002-052611

(51) Int. Cl.[7] ............................................. G01C 21/34
(52) U.S. Cl. .................... 701/200; 701/211; 340/995.1; 340/995.19
(58) Field of Search ................................ 701/200, 209, 701/210, 211; 340/995.1, 995.14, 995.16, 995.19, 995.2, 995.24, 995.26

(56) References Cited

U.S. PATENT DOCUMENTS

| | | | | |
|---|---|---|---|---|
| 5,067,081 A | * | 11/1991 | Person | 701/202 |
| 5,884,218 A | * | 3/1999 | Nimura et al. | 701/208 |
| 5,944,768 A | * | 8/1999 | Ito et al. | 701/200 |
| 6,064,941 A | * | 5/2000 | Nimura et al. | 701/210 |
| 6,128,571 A | * | 10/2000 | Ito et al. | 701/201 |
| 6,138,073 A | * | 10/2000 | Uchigaki | 701/208 |
| 6,321,160 B1 | * | 11/2001 | Takahashi | 701/209 |
| 6,333,702 B1 | * | 12/2001 | Hiyokawa et al. | 340/995.21 |
| 6,434,482 B1 | * | 8/2002 | Oshida et al. | 701/209 |
| 6,510,379 B1 | * | 1/2003 | Hasegawa et al. | 701/202 |
| 2002/0059190 A1 | * | 5/2002 | Ishizaki | 707/2 |
| 2002/0169547 A1 | * | 11/2002 | Harada | 701/211 |

* cited by examiner

Primary Examiner—Gary Chin
(74) Attorney, Agent, or Firm—Wenderoth, Lind & Ponack, L.L.P.

(57) ABSTRACT

A navigation system is provided which obtains facility information and displays a facility icon in a position corresponding to the position of the facility on a map shown on a display. The navigation system includes a facility designating device to designate the facility icon, and a designated facility route guidance device to give route guidance to the facility when the facility designating operation is conducted with the facility designating device.

4 Claims, 7 Drawing Sheets

NAVIGATION SYSTEM

BACKGROUND OF THE INVENTION

1. Field of the Invention

The present invention relates to a navigation system which gives route guidance and, more particularly, to a navigation system which obtains facility information and displays facility icons in positions corresponding to the positions of the facilities on a map shown on a display.

2. Description of the Relevant Art

Normal navigation systems give route guidance to a goal. In addition, with more sophisticated navigation systems, higher-capacity storage media and advances in information and communication technology, a navigation system which obtains a large amount of facility information (through communications, or reading from a built-in storage medium) and displays the obtained information on a map shown on a display has been realized.

However, since the display screen of an on-board navigation system is small, there is a possibility that a display of a large amount of facility information would be rather user-unfriendly, because the map itself would be hard to view due to inevitably smaller characters as the facility information, thereby producing a complicated information display or the like.

SUMMARY OF THE INVENTION

The present invention was accomplished in order to solve the above problem, and it is an object of the present invention to provide a navigation system, producing a display of facility information which is easy to read, and which is user-friendly.

In order to achieve the above object, a navigation system (1) according to the present invention is characterized by capturing facility information from a foreign source and displaying a facility icon in a position corresponding to the facility position on a map shown on a display, which comprises a facility designating device to directly designate the facility icon, and a designated facility route guidance device to give route guidance to the facility when the direct designating operation is conducted on the facility with the facility designating device.

Using the above navigation system (1), when the designating operation of a facility is conducted by the facility designating device, route guidance to the facility is given without another operation for setting a goal, resulting in excellent operability.

A navigation system (2) according to the present invention is characterized by the facility designating device comprising a touch panel for coordinate designation front-mounted on the display, which comprises a designating operation detecting device to judge a first designating operation to have been conducted when the facility designating operation was conducted through the touch panel, and a designated facility information announcing device to announce the facility information of the designated facility when a second facility designating operation different from the first facility designating operation was conducted through the touch panel in the above navigation system (1).

Using the above navigation system (2), route guidance to the facility is given when the first facility designating operation is conducted through the touch panel, and the facility information of the facility is announced when the second facility designating operation is conducted. Therefore, the main operations with respect to facility designation are implemented without a particular operation such as a mode changing operation, resulting in extremely excellent operability.

A navigation system (3) according to the present invention is characterized by comprising a facility icon clearing device to clear the facility icon, when no designating operation is conducted on the facility within a prescribed time after the facility icon being displayed in the above navigation system (1) or (2).

Using the above navigation system (3), facilities which are presumed not to be used by the user are cleared from the display screen, so that unwanted information is cleared from the screen, resulting in a screen on which a map or information which is easy to read.

A navigation system (4) according to the present invention is characterized by capturing facility information from a foreign source and displaying a facility icon in a position corresponding to the facility position on a map shown on a display, which comprises an information freshness measuring device to measure the freshness of the facility information, and a display form changing device to change the display form of the facility icon according to the freshness of the information measured by the information freshness measuring device.

Using the above navigation system (4), the freshness of the facility information can be known at a glance, so that required information can be easily selected.

A navigation system (5) according to the present invention is characterized by capturing facility information from a foreign source and displaying a facility icon in a position corresponding to the facility position on a map shown on a display, which comprises a facility selection device to select a prescribed number of facilities whose detailed information is displayed in order of increasing distance from the car position, and a detailed information display device to display the detailed information of the facilities selected by the facility selection device near the corresponding facility icons.

Using the above navigation system (5), since detailed information of facilities closer to the car position, whose facility information is more necessary, is displayed with priority, it becomes possible to quickly grasp the positions of the facilities and the detailed information thereof, resulting in a display which is easy to read, whereby wanted information is certainly shown.

A navigation system (6) according to the present invention is characterized by capturing facility information from a foreign source and displaying a facility icon in a position corresponding to the facility position on a map shown on a display, which comprises a facility selection device to exclude passed facilities from objects of selection so as to select facilities whose detailed information is displayed, and a detailed information display device to display the detailed information of the facilities selected by the facility selection device near the corresponding facility icons.

Using the above navigation system (6), detailed information of the passed facilities, which is less necessary, is not displayed, resulting in a display which is easy to read.

A navigation system (7) according to the present invention is characterized by comprising a facility icon clearing device to clear displayed facility icons of passed facilities in the above navigation system (5) or (6).

Using the above navigation system (7), facility icons of passed facilities, which are less necessary, are not displayed, resulting in a map display which is easy to watch.

A navigation system (8) according to the present invention is characterized by comprising a scroll display device to produce a scroll display of detailed information of facilities in a predetermined area of the display in any of the above navigation systems (1)–(7).

Using the above navigation system (8), it becomes possible to display detailed information using relatively large characters, which makes it easy to confirm the detailed information.

BRIEF DESCRIPTION OF THE DRAWINGS

FIG. 4(A) is an illustration showing a display form of facility icons in the navigation system according to the embodiment, while

FIGS. 5(A) and 5(B) are illustrations showing a display form of facility detailed information in the navigation system according to the embodiment while

FIG. 6(A) is an illustration showing a display form of facility detailed information in the navigation system according to the embodiment, while FIG. 7(A) is an illustration showing the selection making operation of facility icons in the navigation system according to the embodiment, while

DESCRIPTION OF THE PREFERRED EMBODIMENTS

Figure 1:
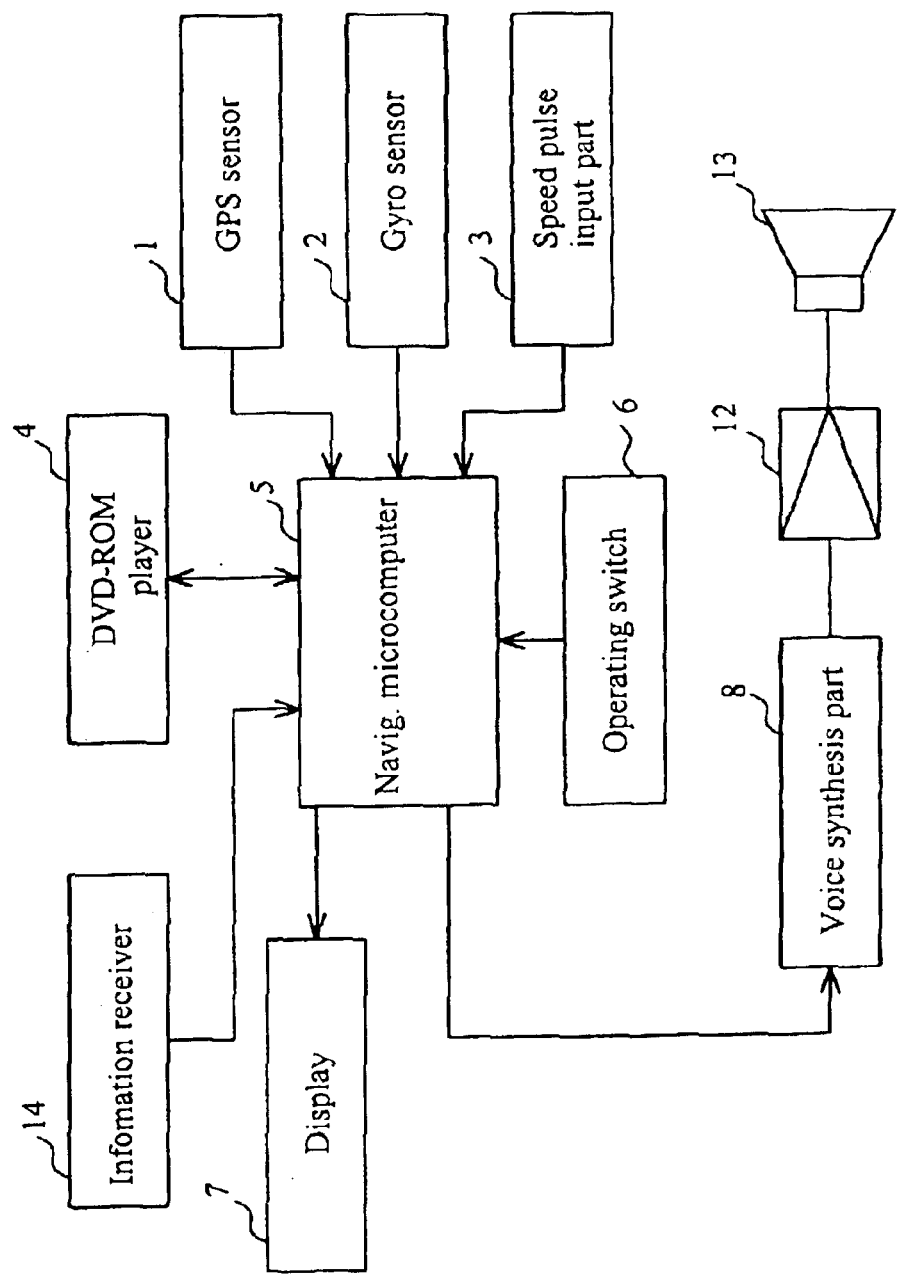
FIG. 1 is a block diagram schematically showing the construction of a navigation system according to an embodiment of the present invention.

The preferred embodiments according to the present invention are described below by reference to those drawings. FIG. 1 is a block diagram schematically showing the construction of a navigation system according to an embodiment.

In the figure, numeral reference 1 represents a GPS sensor, which receives signals from GPS satellites, computes a vehicle position from those signals and outputs it to a microcomputer for navigation system control (hereinafter, referred to as a navig. microcomputer) 5. A gyro sensor 2, being a sensor for detecting changes in the direction of the vehicle, comprising a gyro, outputs detected signals to the navig. microcomputer 5. The navig. microcomputer 5 integrates the detected signals from the gyro sensor 2 so as to compute the direction in which the vehicle is headed.

A speed pulse input part 3 captures a speed pulse, comprising pulses generated at every prescribed distance traveled (the number of pulses within a prescribed period is proportional to a vehicle speed) from a speed sensor (not shown) mounted on the vehicle side, and outputs the speed pulse to the navig. microcomputer 5 after conducting noise cancellation, waveform shaping and the like thereon. The speed sensor mounted on the vehicle side is usually used for controlling a driving system of the vehicle such as fuel injection control or ignition timing control, which is an existing component in the vehicle. As the speed sensor, a magnetic sensor which comprises a magnet rotating in synchronization with an axle and a lead switch whose on-off state alters according to the situation of the magnetic field changing depending on the rotation position of the magnet, an optical sensor which comprises a shield rotating in synchronization with the axle, and a light receiving element and a light emitting element with an optical path whose interrupted state alters depending on the rotation position of the shield, or the like is used.

A DVD-ROM player 4 reads needed data from a DVD-ROM (an optical disk), in which map data is stored, according to a control signal from the navig. microcomputer 5, and outputs it to the navig. microcomputer 5. Since the DVD-ROM is exchangeable, it is possible to respond to the update of the map (the upgrade of the map DVD-ROM). And a hard disk (not shown) may be adopted as a substitute for the DVD-ROM player 4.

An operating switch 6, being a switch for navigation system control, comprises pushbutton switches arranged on the navigation system main body, an ON-OFF switch, and a switch for selecting the direction such as a joystick and the like arranged on an infrared remote control or the like. Furthermore, the operating switch 6 includes a transparent touch panel mounted on the front of a display 7, which enables an input of coordinates corresponding to a position on the display 7, for example, designation of the position on a map.

The navig. microcomputer 5 computes the car position by the self-contained navigation system using a signal detected by the gyro sensor 2 and a speed pulse from the speed pulse input part 3, and makes this computed car position and a position signal from the GPS sensor 1 complement each other so as to determine the car position. According to this determined car position and the operating state of the operating switch 6, the navig. microcomputer 5 reads required map data and the like from the DVD-ROM by controlling the DVD-ROM player 4 and conducts the processing of computing a route to a goal and the like, so as to conduct the control for showing a corresponding map, a route, various kinds of information, and operation guidance, on the display 7 comprising a liquid crystal display. The navig. microcomputer 5 includes a RAM and a ROM used for storage of various kinds of data and programs, or processing.

To the navig. microcomputer 5, an information receiver 14 is connected as a receiving device to receive information. The navig. microcomputer 5 conducts the control for displaying facility information, news, traffic information, weather forecasts and entertainment information received by the information receiver 14 on the display 7, or the control for outputting the data for voice synthesis to a below-described voice synthesis part 8. The facility information which the information receiver 14 receives includes facility positions, facility types, facility names and detailed information specific to each facility (for example, menu information at restaurants, or special sale information at supermarkets). Those received pieces of information are stored in the RAM within the navig. microcomputer 5. In another embodiment, a receiving device for receiving information may be a two-way communication device such as a portable telephone. In this case, required information is obtained through communications with an information center.

The voice synthesis part 8, comprising a microcomputer, processes textual data from the navig. microcomputer 5 so as to produce a composite voice signal and outputs it to an amplifier 12. The amplifier 12 amplifies the composite voice signal and transfers it to a speaker 13 arranged inside the car so as to output the voice from the speaker 13.

Figure 2:
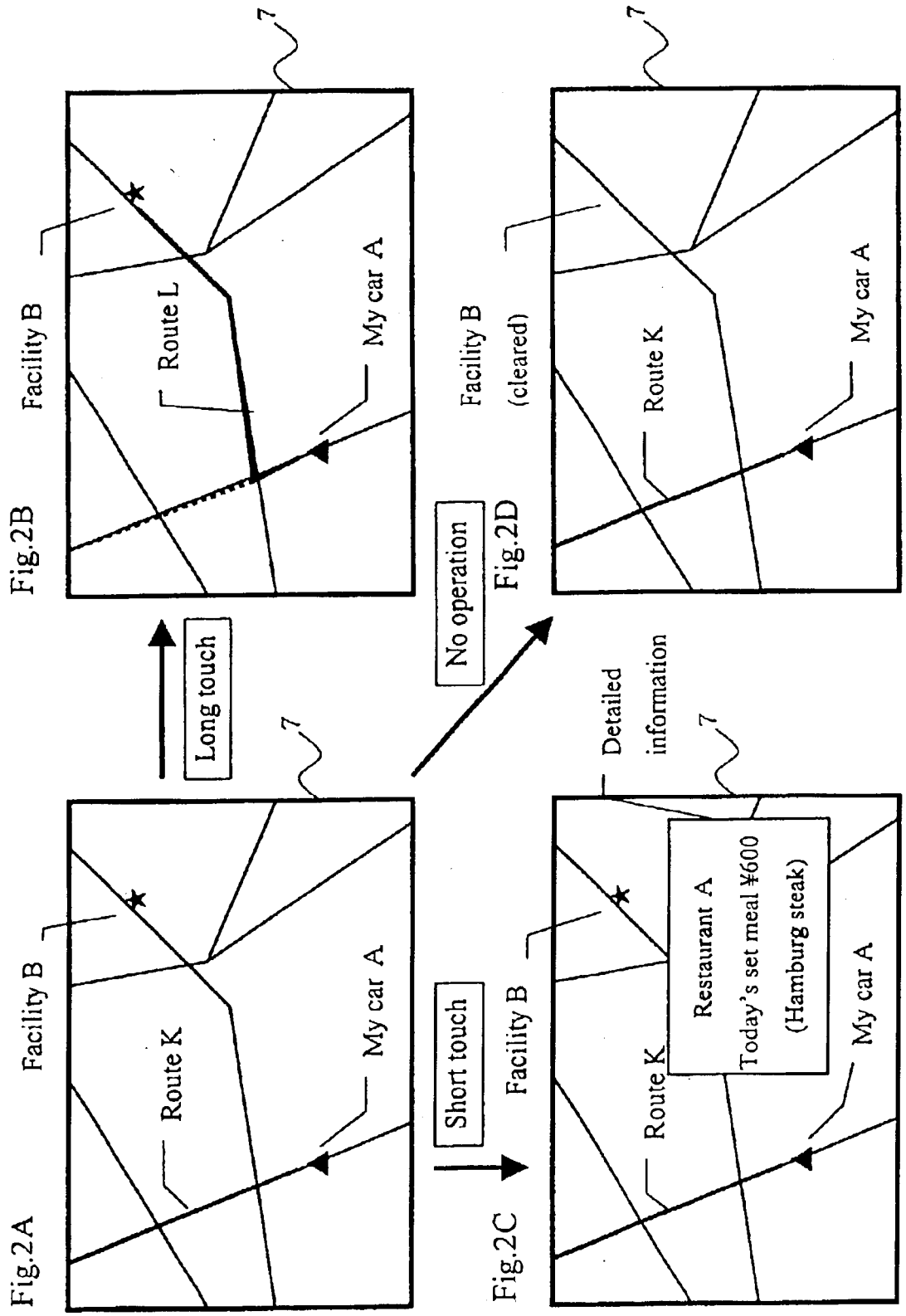
FIGS. 2(A)–2(D) are illustrations showing the state of displays in the navigation system according to the embodiment.

The facility route guidance operation of the navigation system according to this embodiment is described below. FIG. 2 is an illustration showing a display state in the navigation system.

In a state of normal route guidance, as shown in FIG. 2(A), a my-car mark A is displayed in a position corresponding to the my-car position on a map. A route K to a goal is displayed in a form which makes it possible to distinguish the route from roads, for example, using a line heavier than the roads and differently colored therefrom in this embodiment. A facility icon of a facility present within the display range of a map (a facility whose information is received, or stored in the RAM within the navig. microcomputer 5) is displayed in the corresponding position on the map.

When the position of the facility B is directly touched with a finger for a short time (e.g. less than 2 seconds) under this situation to carry out a coordinate input through the touch panel (hereinafter, referred to as a touch operation), detailed information of the facility B is displayed near the facility B on the map, as shown in FIG. 2(C). When a touch operation on the position of the facility B for a long time (e.g. 2 or more seconds) is carried out, a route L to the facility B is found and displayed on the map, as shown in FIG. 2(B), and route guidance to the facility B is given. Furthermore, when no designating operation of the facility B is conducted in a prescribed time after the facility icon of the facility B was displayed, the icon of the facility B on the map is cleared, as shown in FIG. 2(D). In this embodiment, the following processing is differentiated depending on the time length of the touch operation, but in another embodiment, the following processing may be differentiated by another way such as depending on whether the operation is a single touch or a double touch (two touches within a prescribed short time).

Figure 3:
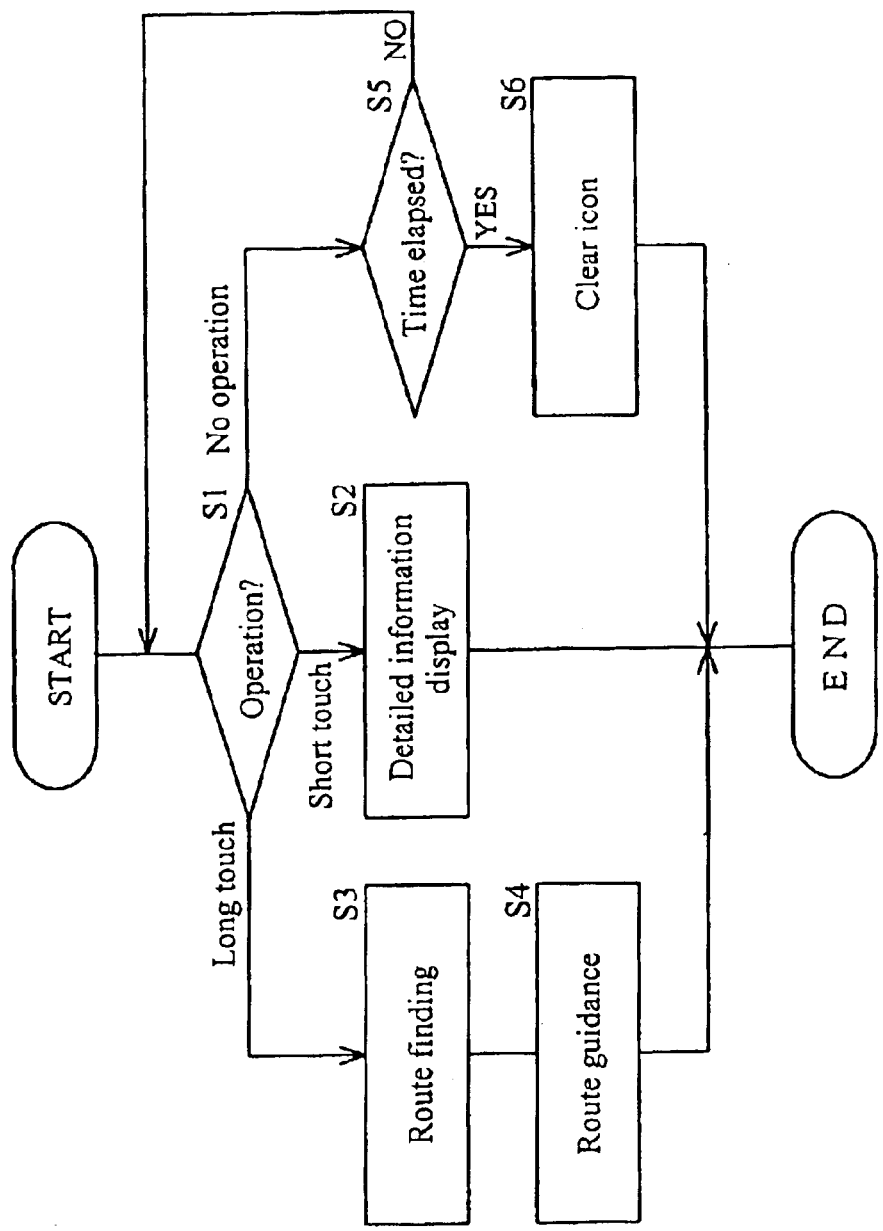
FIG. 3 is a flow chart showing the facility information display processing performed by a navig. microcomputer of the navigation system according to the embodiment.

The facility information display processing performed by the navig. microcomputer 5 in order to realize the above operation is described below by reference to a flow chart shown in FIG. 3. The facility information display processing is conducted when a facility whose information is obtained comes into the display range of the map.

In Step 1, whether the designating operation of a facility through the touch panel was conducted or not, and what type of the operation it is, are judged. When it is judged that no operation was conducted, the processing goes to Step 5. When it is judged that the long touch operation (e.g. 2 or more seconds) was conducted, it goes to Step 3. When it is judged that the short touch operation (e.g. less than 2 seconds) was conducted, it goes to Step 2. In this embodiment, the operation through the touch panel is mentioned, but in another embodiment, the operation through speech recognition (a facility name spoken is recognized), or both the speech recognition and the touch panel operation may be used.

In Step 2, processing wherein detailed information of the designated facility is read from the RAM and displayed is conducted (in another embodiment, voice synthesis output processing, or both of them may be conducted), and then the processing ends. In Step 3, a route from the current car position to the designated facility is found, and then it goes to Step 4. In Step 4, processing wherein route guidance to the designated facility is given based on the found route (route display processing on the map and speech guidance processing) is conducted, and then the processing ends.

In Step 5, whether the elapsed time from when a facility whose information was obtained came into the display range of the map is not less than a prescribed time is judged. When it is judged to be not less than the prescribed time, the processing goes to Step 6, and when it is judged to be less than the prescribed time, it returns to Step 1. In Step 6, the facility icon is cleared, and then the processing is ended.

Figure 4A:
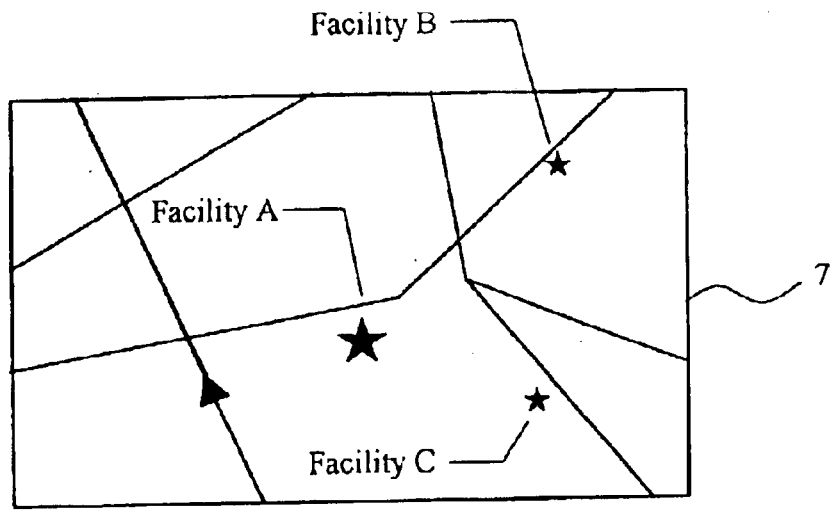
Figure 4B:
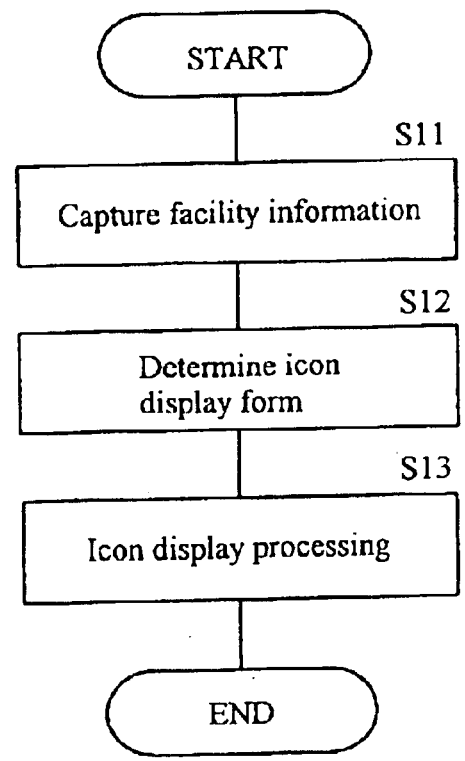
FIG. 4(B) is a flow chart showing the facility icon display processing performed by the navig. microcomputer in order to realize the display form of facility icons.

A display form of facility icons of the navigation system according to the present embodiment is described below by reference to FIG. 4. FIG. 4(A) is an illustration showing a display form example of facility icons, while FIG. 4(B) is a flow chart showing the facility icon display processing performed by the navig. microcomputer 5 in order to realize the display form. Here, this processing is conducted when a facility whose information is obtained comes into the display range of the map.

A facility icon is displayed in a form which varies depending on the freshness of the facility's information (predicted with the reception time, or the formation time of the information (formation time information added by the information provider)). In the example shown in FIG. 4(A), the facility icons vary in size according to the elapsed time after information acquisition. A facility A is displayed with a large facility icon, because less than 24 hours has passed since the acquisition of the information thereof A facility B is displayed with a facility icon of middle size, because 24 hours up to less than 48 hours has passed since the acquisition of the information thereof. A facility C is displayed with a small facility icon, because 48 hours or more has passed since the acquisition of the information thereof. As other methods for expressing the freshness of facility information, a method wherein the color of facility icons is varied, or a method wherein facility icons are caused to flash or not, or the combination of these methods is used. In another embodiment, any of these methods may be adopted. The display form of facility icons may be user-selectable, or may be preset on the system side.

The processing performed by the navig. microcomputer 5 in order to realize the changes in the above display form is described below by reference to the flow chart shown in FIG. 4(B). In Step 11, facility information of an object of facility icon display is captured from the RAM, and then the processing goes to Step 12. In Step 12, the display form of the facility icon is determined based on the acquisition time information of the information included in the captured facility information, and it goes to Step 13. Here, the threshold values (time values to be compared with for judgment) of the information acquisition time at which the display form of the facility icon is changed are stored in the RAM, and are changeable using the operating switch 6, so that they can be changed according to the user's preference. In Step 13, the facility icon is displayed on the map in the display form determined, and then the processing ends.

Figure 5A:
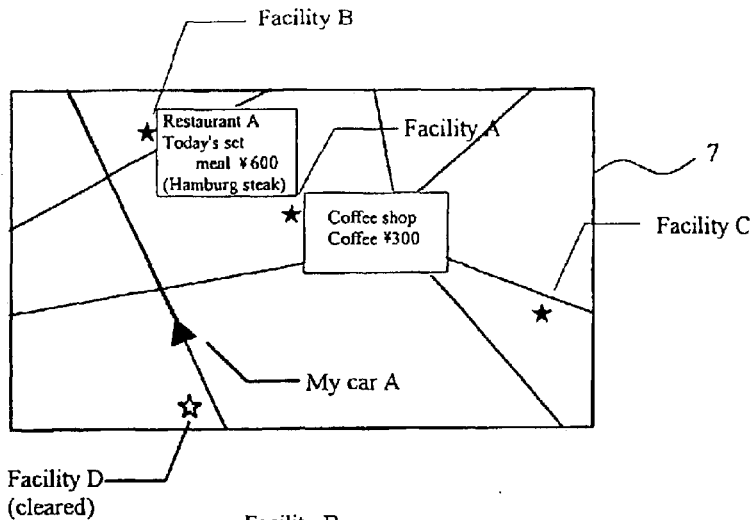
Figure 5B:
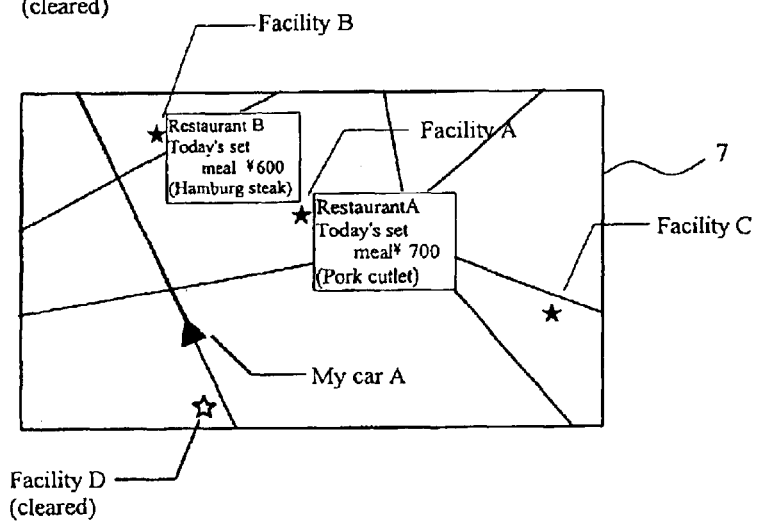
Figure 5C:
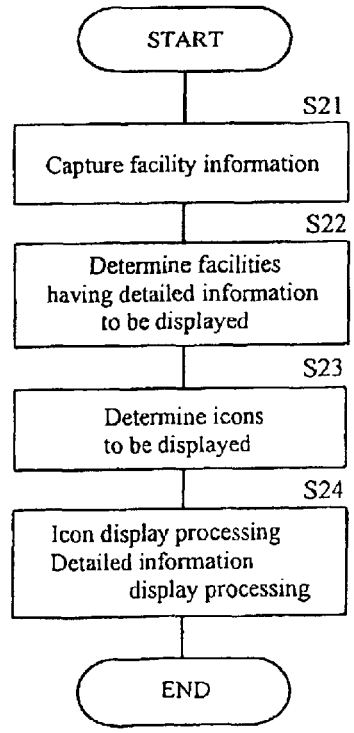
FIG. 5(C) is a flow chart showing the facility detailed information display processing performed by the navig. microcomputer in order to realize the display form.

A first display form of facility detailed information of the navigation system according to the present embodiment is described below. FIGS. 5(A) and 5(B) are illustrations showing a display form of facility detailed information, while FIG. 5(C) is a flow chart showing the display processing of facility detailed information performed by the navig. microcomputer 5 in order to realize the display form. This processing is repeatedly conducted with other processing (such as map display processing) under operating conditions of the navigation system.

In the example shown in FIG. 5(A), facility icons of facilities A, B and C are displayed on a map shown on the display 7. Regarding the facilities A and B within the range of a prescribed distance from the my-car position, detailed information is displayed near the corresponding facility icons. In this embodiment, the range of the prescribed distance is a circular range with the car position in the center thereof, but in another embodiment, it may be an oval range which gets a little wider in the direction in which the car is headed, or the like. The data defining this range is stored in the RAM, and is changeable through the user's operation of the operating switch 6, so that the range can be set according to the user's preference. A facility D which the car has passed along the route to the goal, is excluded from the selection objects of detailed information display, and its facility icon is cleared from the map, so as to make the map easy to watch.

In another embodiment, instead of a detailed information display of facilities within the range of a prescribed distance from the my-car position, a prescribed number of facilities may be selected in increasing order of distance from the my-car position so as to display the detailed information thereof. Alternatively, both conditions may be satisfied, that is, a prescribed number of facilities may be selected from among facilities within the range of a prescribed distance from the my-car position in increasing order of distance from the my-car position so as to display the detailed information thereof.

In the example shown in FIG. 5(B), facility icons of facilities A, B and C are displayed on a map shown on the display 7. Regarding the facilities A and B which fit a key word input by the user (in this example, meal is input as a key word and restaurants present on the displayed map are selectively displayed), the detailed information thereof is displayed near the corresponding facility icons. However, a facility D, which the car has passed along the route to the goal, is excluded from the display objects of detailed information, and its facility icon is cleared from the map, so as to make the map easy to view.

The processing performed by the navig. microcomputer 5 in order to realize the above operation is described below. In Step 21, information of facilities present on the displayed map is captured, and the processing goes to Step 22. In Step 22, facilities which meet display conditions (conditions concerning the distance from the my-car position and a key word) are determined based on the captured detailed information of the facilities, and it goes to Step 23. In Step 23, icons to be displayed are determined, or facilities which are present on the displayed map but have been passed by the car along the route to the goal are excluded from facilities whose icons are displayed, and then it goes to Step 24. In Step 24, display processing of facility icons is conducted as to the facilities whose facility icons are selected for display, and display processing of detailed information is conducted as to the facilities whose detailed information is selected for display, and then the processing ends.

Figure 6A:
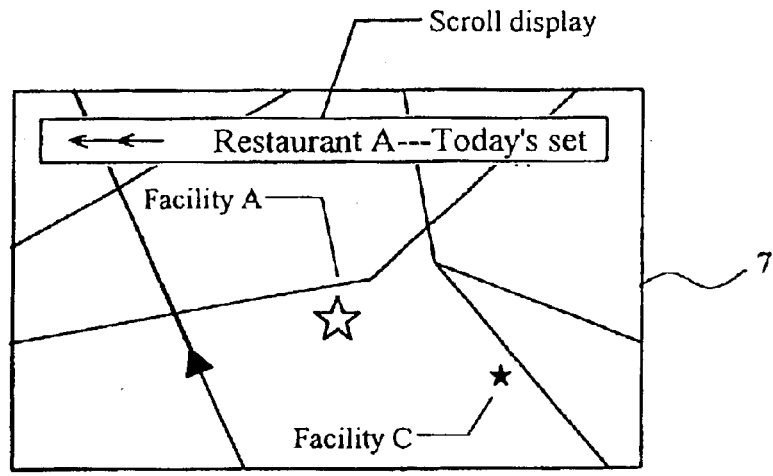
Figure 6B:
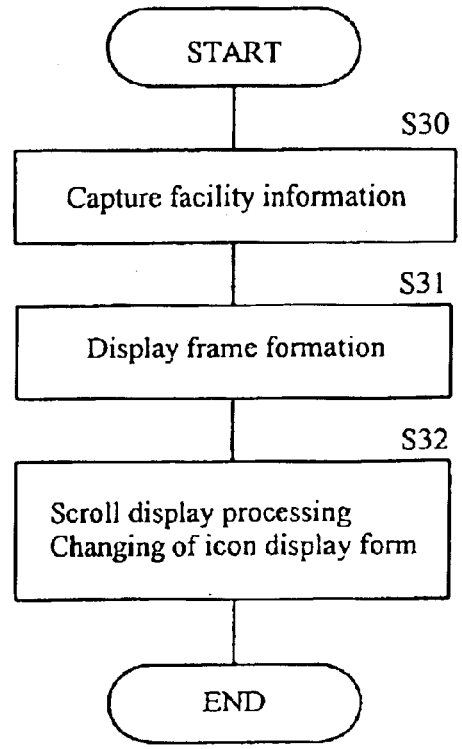
FIG. 6(B) is a flow chart showing the facility detailed information display processing performed by the navig. microcomputer in order to realize the display form.

A second display form of facility detailed information of the navigation system according to the present embodiment is described below. FIG. 6(A) is an illustration showing a display form of facility detailed information, while FIG. 6(B) is a flow chart showing the display processing of facility detailed information performed by the navig. microcomputer 5 in order to realize that display form. This processing is repeatedly conducted with other processing (such as map display processing) during operating conditions of the navigation system.

FIG. 6(A) shows a situation wherein a scroll display frame is placed at the top of a map shown on the display 7 and detailed information of a facility A which is an object of detailed information display is displayed by scrolling within this scroll frame. As to the facility A whose detailed information is being displayed by scrolling, the display form of its icon is differentiated from that of other icons. In this example, the color of the facility icon is changed for differentiation, but in another embodiment, the facility icon of a facility whose detailed information is being displayed by scrolling may be caused to flash, or the facility icon thereof may be made larger than other facility icons, or the like.

The processing performed by the navig. microcomputer 5 in order to realize the above display processing of detailed information is described below by reference to the flow chart shown in FIG. 6(B). In Step 30, information of facilities present on a displayed map is captured, and then the processing goes to Step 31. In Step 31, a scroll display frame for scroll display is formed at the top of the map, and then it goes to Step 32. In Step 32, detailed information of a facility is displayed by scrolling within the scroll display frame and the display form of its corresponding facility icon is changed, and then the processing ends.

In the present embodiment, a method wherein facility information is displayed by scrolling is adopted, but in another embodiment, a method wherein facility detailed information is output by voice th rough voice synthesis in place of the scroll display may be adopted, or the combination of the scroll display with the voice output may be adopted.

Figure 7A:
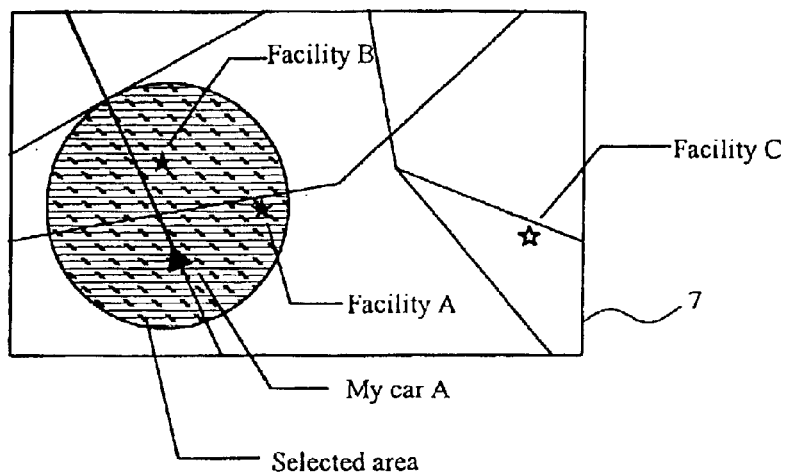
Figure 7B:
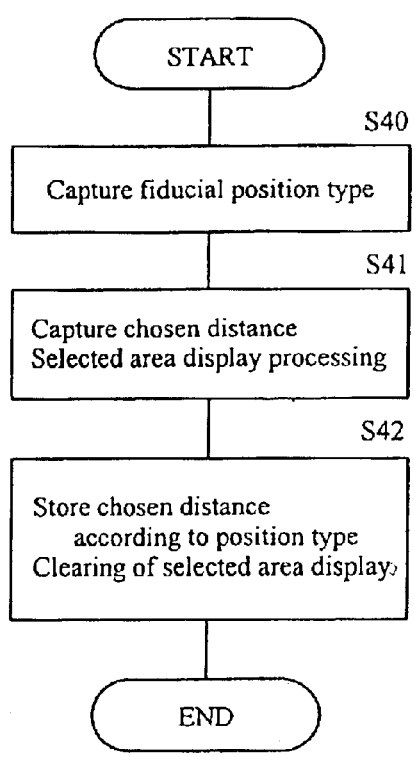
FIG. 7(B) is a flow chart showing the selection making processing of facility icons to be displayed performed by the navig. microcomputer in order to realize the selection making operation.

The selection making operation of facility icons to be displayed of the navigation system according to the present embodiment is described below. FIG. 7(A) is an illustration show ing the selection making operation of facility icons to be displayed, while FIG. 7(B) is a flow chart showing the selection making processing of facility icons to be displayed performed by the navig. microcomputer 5 in order to realize the selection making operation. This processing is conducted when the selection operation of facility icons to be displayed is conducted.

In FIG. 7(A), the area (selected area) of facilities whose facility icons are displayed on a map shown on the display 7 is displayed. The situation wherein facility icons of facilities A and B present within the selected area are displayed is shown therein. Th is selected area is changeable through the user's operation of the operating switch 6. When the selected area is made in the operating state by the user's operation of the operating switch 6, the selected area is displayed, and after the setting operation of the selected area is completed, the display of the selected area is made in a state of disappearing.

In the present embodiment, the selected area is set with the my-car position as the fiducial position (such as the center), but in another embodiment, the selected area may be set with the starting position, goal position, via place position or the like as the fiducial position (such as the center). In that case, the fiducial position of the selected area is determined by the user's operation of the operating switch 6.

The processing performed by the navig. microcomputer 5 in order to realize the above selection making operation of facility icons to be displayed is described below by reference to FIG. 7(B). In Step 40, the type of the fiducial position, or which is selected from among the my-car position, starting position, goal position and via place position is captured, and then the processing goes to Step 41. In Step 41, a chosen distance is captured, and then it goes to Step 42. At this time, the processing of displaying the selected area according to the input fiducial position type and chosen distance on the map is conducted simultaneously. In Step 42, the input fiducial position type and chosen distance are stored. After a prescribed time elapses, the selected area display shown on the map is cleared, and then the processing ends. After that, facilities whose facility icons are to be displayed are selected according to the set fiducial position type and the chosen distance, and only the facility icons of the selected facilities are display on the screen.

What is claimed is:

1. A navigation system, which receives facility information from a facility information providing device, and displays a facility icon on a map shown on a display, the navigation system comprising:

a facility designating device used for directly designating the facility icon by touching a position on the display corresponding to the facility icon displayed on the map; and a designated facility route guidance device operable to give route guidance to a facility corresponding to the facility icon displayed on the map when the touching operation is conducted on the facility icon displayed on the map with the facility designating device;

wherein the facility icon is displayed on the map at a position corresponding to a location of the facility.

2. A navigation system according to claim 1, wherein the facility designating device comprises a touch panel for coordinate designation mounted on a front of the display, comprising:

a designating operation detecting device operable to judge whether a first facility touching operation has been conducted when the touching operation is conducted through the touch panel; and a designated facility information announcing device operable to announce facility information about the facility when a second facility touching operation, different from the first facility touching operation, is conducted through the touch panel.

3. A navigation system according to claim 1, further comprising a facility icon clearing device operable to clear the facility icon when the touching operation is not conducted on the facility icon within a prescribed time after the facility icon is displayed.

4. A navigation system according to claim 1, further comprising to automatically scroll a display of detailed information about the of the display.

* * * * *